United States Patent [19]
Kanesaka

[11] Patent Number: 4,461,151
[45] Date of Patent: Jul. 24, 1984

[54] INTERNAL COMBUSTION ENGINE

[75] Inventor: Hiroshi Kanesaka, Kanagawa, Japan

[73] Assignee: Kanesaka Technical Institute Ltd., Kanagawa, Japan

[21] Appl. No.: 395,381

[22] Filed: Jul. 6, 1982

Related U.S. Application Data

[63] Continuation of Ser. No. 145,540, May 1, 1980, abandoned.

[30] Foreign Application Priority Data

May 7, 1979 [JP] Japan ................................ 54-54720

[51] Int. Cl.³ .......................... F02B 37/00; F01L 1/34
[52] U.S. Cl. .................................... 60/611; 123/405; 123/569
[58] Field of Search .................. 60/600, 601, 611; 123/321, 336, 340, 347, 348, 402, 403, 405, 564, 569, 90.6, 90.18, 90.17, 90.16

[56] References Cited

U.S. PATENT DOCUMENTS

| 1,787,717 | 1/1931 | Boulet | 123/90.17 X |
| 1,952,881 | 3/1934 | Minter | 123/568 |
| 2,785,667 | 3/1957 | Miller | 123/90.16 |
| 2,936,575 | 5/1960 | Lieberherr | 123/90.16 X |
| 2,989,840 | 6/1961 | Lieberherr | 60/611 |
| 3,015,934 | 1/1962 | Miller | 60/601 |
| 3,080,704 | 3/1963 | Nallinger | 123/321 X |

Primary Examiner—Michael Koczo
Attorney, Agent, or Firm—Sughrue, Mion, Zinn, Macpeak, and Seas

[57] ABSTRACT

A turbocharged internal combustion engine in which a substantially constant output power is provided over a wide range of engine speeds. A turbocharger is utilized which provides its maximum output at an intermediate engine speed. A rotary valve is provided in the intake manifold passages for each of the cylinders of the engine. The valve is rotated at half the speed of the crankshaft with the phase of the valve controlled in accordance with a predetermined engine parameter such as the intake manifold pressure, the exhaust manifold pressure, or the speed of rotation of the engine.

15 Claims, 19 Drawing Figures

INTERNAL COMBUSTION ENGINE

This is a continuation of application Ser. No. 145,540, filed May 1, 1980, now abandoned.

BACKGROUND OF THE INVENTION

The present invention relates to an internal combustion engine. In general, in four-cycle gasoline engines, an air/fuel mixture having a predetermined constant air/fuel ratio is introduced into the cylinders thereof following which compression, combustion, expansion and exhaust cycles are performed. In case the engine is loaded, the amount of suction on the incoming mixture is limited and controlled by a throttle valve. The amount of suction is reduced in proportion to the negative intake pressure generated at such times to thereby adjust or control the engine output power.

Figure 1:
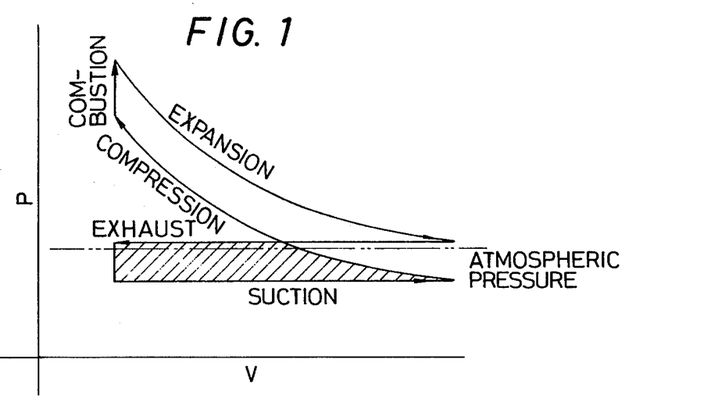
FIG. 1 is a graph pertaining to partial load operations of a conventional four cycle gasoline engine.

A pressure-volume graph (P-V graph) for such a known four-cycle gasoline internal combustion engine operated as noted above is shown in FIG. 1. The negative work portion of the complete cycle increases in proportion to the negative suction pressure as indicated by the hatched region in FIG. 1. This negative work causes the fuel consumption of the engine to increase as the engine is more heavily loaded.

The above-noted negative work is inherent to prior art gasoline engines which utilize a fixed air/fuel ratio. In particular, since partial loads on the engine are quite frequent, the increase in the fuel consumption for partial loads leads to an increase in the overall fuel consumption of the vehicle. Improvements in fuel consumption have been of utmost importance in recent years.

On the other hand, in a turbocharged engine, the higher the engine rotational speed, the greater is the engine output power which can be obtained. However, a turbocharged engine has an inherent defect in that a sufficiently high output power often cannot be obtained at low rotational speeds. It is desirable that maximum torque be produced at intermediate rotational speeds of an automotive engine, that is, at approximately 50% of the maximum rotational speed of the engine. Accordingly, to obtain such torque characteristics, it is required that the fuel supply be restricted when the intermediate engine rotational speed is reached to thereby reduce the torque of the engine. For this reason, the full capabilities of the turbocharged engine have not yet been fully utilized.

A turbocharger for an automotive engine usually employs a velocity-type compressor in which the outlet pressure thereof is in proportion to the second power of the emission flow used to drive the turbocharger's turbine. If the turbocharger is used in an automotive engine, the outlet pressure thereof will be in proportion to the second power of the engine rotational speed.

Figure 8:
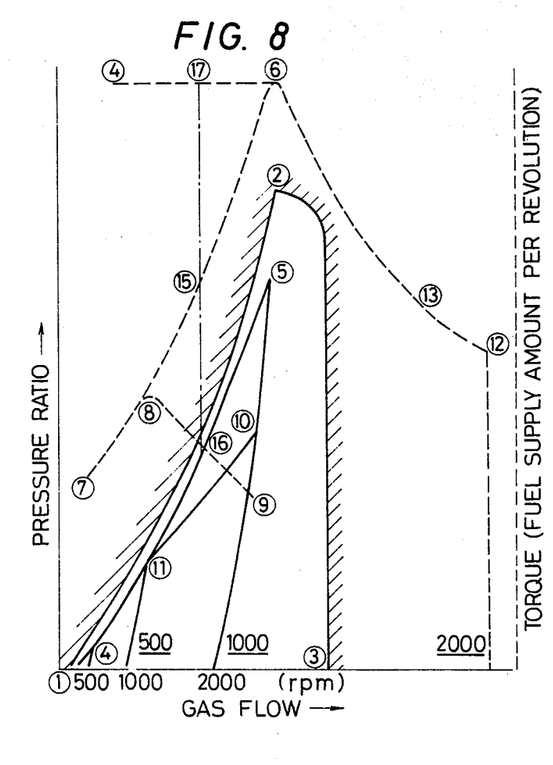
FIG. 8 is a graph showing properties of the turbocharged engine.

In FIG. 8, a curve (1) to (2) is a typical operational curve of a turbocharged engine. If a higher pressure ratio were attempted, the engine would operate in a surging region designated by the hatched area in FIG. 8 and, accordingly, it would be impossible to output compressed air. A curve (2) to (3) shows the amount of air produced and the pressure thereof. Attempts at increasing the pressure of the output air beyond the curve (2) to (3) result in damage to the turbocharger by an excessively high rate of rotation.

At the idle speed of the engine, for example, at a speed of about 500 rpm, little turbocharger pressure is, as shown at point (4), generated. For middle speeds or, correspondingly, the middle range of gas flow, thereof, a significant amount of turbocharged pressure is generated. For middle engine speed or gas flow values, generation of turbocharged pressure at about a quarter of the maximum output is possible. For example, at 1000 rpm a pressure ratio corresponding to the point (11) in FIG. 8 is attained. At the maximum gas flow or engine speed values, for example, 2000 rpm, an increase by a factor of four times relative to that at 1000 rpm is possible so that the turbocharged pressure increases up to the point (5).

On the other hand, the torque of the turbocharged engine increases to the point (6) within which the amount of fuel mixture supplied increases in proportion to the turbocharged pressure as indicated by the dotted curve in FIG. 8 whereby a torque property as shown by curve (7) to (6) is obtained. A high torque property as shown by curve (7) to (6) may be usefully employed in ship engines in which a propeller is driven. However, an automotive engine requires torque characteristics as shown by curve (7), (8) to (9) where high torques are provided at the middle engine speeds. Accordingly, as the engine rotational speed increases, the amount of fuel to be fed should be decreased to thereby realize the torque characteristics as indicated by the curve (8) to (9). In this case, since the amount of gas emitted increases in proportion to the engine speed, even if the amount of fuel to be supplied is restricted, the curve will be raised up to point (10) resulting in an unduly high increase in the engine compression pressure.

As illustrated above, in a modern turbocharged engine designed for automotive use, even though the turbocharger is able to attain the supercharged pressure shown as at point (5) in FIG. 8, to obtain the actual desired torque characteristics (7)-(8)-(9), only a supercharged pressure up to point (11) is in fact used resulting in the usage of only a quarter of the maximum capacity of the turbocharger.

Accordingly, an object of the present invention is to provide an internal combustion engine solving the above noted problems inherent in various conventional engines.

Another object of the invention is to improve the fuel consumption at partial loads of, for example, gasoline engines by decreasing the negative work at partial loads to as small a value as possible.

Still another object of the invention is to provide a turbocharged engine for automotive use having a high output power and a low fuel consumption, in which the maximum possible output of the supercharger is employed at the middle speeds of the engine, the amount of gas flow and thermal energy supplied to the exhaust gas turbine of the turbocharger are maintained constant and the amount of air and pressure outputted from a compressor of the turbocharger is also maintained constant whereby the maximum ability or performance of the turbocharger is utilized.

SUMMARY OF THE INVENTION

These, as well as other objects of the invention, are met by an internal combustion engine including at least one main piston and an associated cylinder, a combustion chamber being defined by the main piston and cylinder, an intake port communicating with intake passage means, an exhaust port communicating with exhaust passage means, a crankshaft, fuel supply control means, control valve means for periodically opening and closing the intake passage means in response to rotation of the crankshaft, the control valve means being disposed in the intake passage means, and means for adjusting the timing of the control valve means in response to a predetermined engine operating parameter. Preferably, the control valve means is a rotary type valve rotatably disposed in the intake passage means. The rotary type valve is rotated in response to rotation of the crankshaft. The adjusting means may also operate in response to the fuel supply control means. The predetermined engine operating parameter may be the pressure in the intake passage means, the pressure in the exhaust passage means or the speed of rotation of the engine.

In a preferred embodiment, the adjusting means includes an annular adjusting member having at least one protrusion engaged with helical splines of a rotary shaft driven by the crankshaft through a gear mechanism and with helical splines of a drive shaft of the control valves. The adjusting member is engaged also with lever means for controlling the phase difference between the drive shaft and the rotary shaft. A turbocharger is utilized which has a maximum output at an intermediate engine speed.

DESCRIPTION OF THE PREFERRED EMBODIMENTS

The present invention will hereinafter be described with reference to the accompanying drawings.

Figures 2, 3:
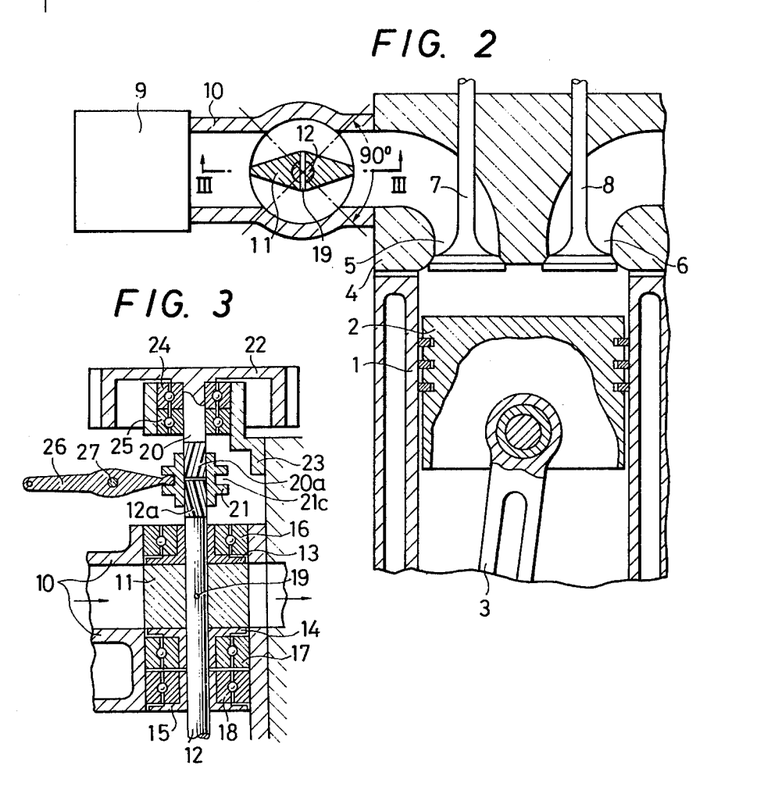
FIG. 2 is a cross-sectional view of portions of an engine provided with a rotary valve according to a preferred embodiment of the present invention.
FIG. 3 is a cross-sectional view taken along the line III—III of FIG. 2 showing the control mechanism for the rotary valve of FIG. 2.

FIG. 2 shows a four cycle gasoline engine constructed according to the present invention in which a reciprocable piston 2, rotatably coupled to an end of a piston connecting rod 3, is disposed in a cylinder 1. The other end of the piston 2 is connected to a crankshaft (not shown). Above the cylinder 1 is disposed a cylinder head 4 in which an intake or suction port 5 and an exhaust port 6 are formed and in which are positioned an intake valve 7 and an exhaust valve 8, respectively. In an intake passage between the intake port 5 and a carburetor, indicated generally at 9, a rotary valve 11, used as a control valve, is driven through a gear transmission mechanism by the crankshaft of the engine. As an example, a driving mechanism for the above-described rotary valve 11 will be hereinafter described with reference to FIG. 3.

The rotary valve 11 is secured to a drive shaft 12 by a pin 19. Sleeves 13, 14 and 15 secured to the drive shaft 12 clamp the rotary valve 11. The drive shaft 12 is rotatably supported by ball bearings 16, 17 and 18 arranged between the respective sleeve and walls of the intake passage 10. The drive shaft 12 is coupled by an adjustment member 21, hereinafter described, to a rotary shaft 20 driven by a timing gear 22 coupled in a power transmitting relationship through a gear mechanism and through a crankshaft (not shown) rotatably connected a frame body 23 by ball bearings 24 and 25. As shown in FIG. 2, the rotary valve 11 has opening and closing periods at intervals of approximate 90°. The rotary valve 11 is driven at half of the rotational speed of the crankshaft through the above-described timing gear 22. The intake stroke period of the engine occurs for approximate 180° of the crank angle. Therefore, the rotary valve 11 has an approximate 180° valve opening period in terms of the crank angle of the crankshaft.

Figure 4:
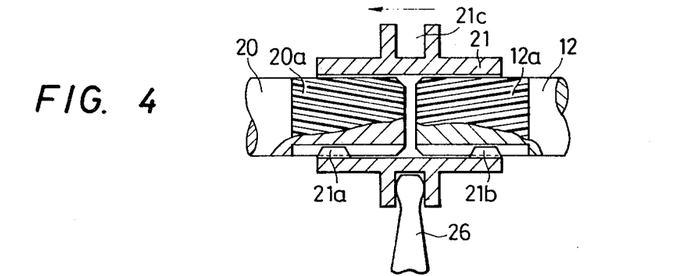
FIG. 4 is a locally enlarged cross-sectional view of primary parts of the mechanism of FIG. 3.

Construction of a mechanism for adjusting the opening and closing periods of the rotary valve 11 will hereinafter be described with reference to FIGS. 3 and 4. At respective opposing ends of the drive shaft 12 and the rotary shaft 20 are formed helical splines 12a and 20a, screw directions of which are opposite to each other. Projections 21a and 21b formed in the inner periphery of the adjustment member 21 are engaged with the helical splines 12a and 20a, respectively. For example, by moving the member 21 leftward of FIG. 4, the drive shaft 12 is angularly displaced in a first direction relative to the rotary shaft 20 and, similarly, for rightward movement of the member 21, the reverse angular movement of the drive shaft 12 is obtained. Thus, by axial movements of the adjustment member 21, the rotational timing of the drive shaft may be varied to thereby control the opening and closing periods of the rotary valve 11.

The axial movements of the adjustment member 21 are carried out by the swing movements of an adjustment lever 26 which is engaged at one end with a retainer groove 21c formed in the periphery of the adjustment member 21. The lever 26 is pivotally supported at its intermediate position by the shaft 27 with the other end cooperating with a fuel supply rate controlling mechanism, specifically the accelerator pedal of the vehicle.

Figure 5A:
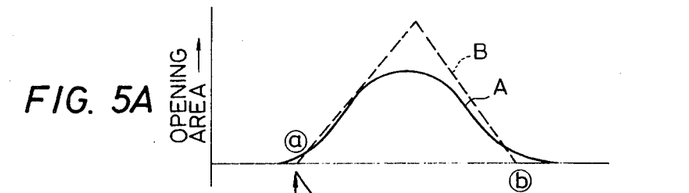
FIGS. 5A and 5B are graphs pertaining to full load operation of the engine.
Figure 5B:
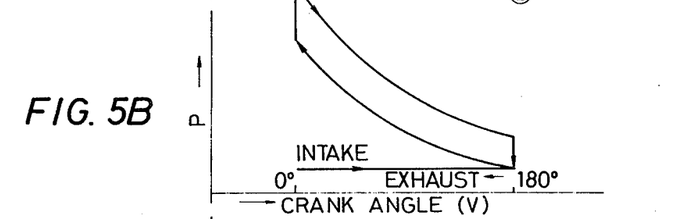
Figure 6A:
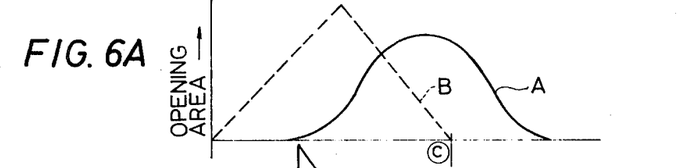
FIGS. 6A and 6B are graphs pertaining to partial load operation of the engine.

The valve opening and closing timing periods of the intake valve 7 and the rotary valve 11 will be hereinafter described with reference to FIGS. 5a, 5B, 6A and 6B. In FIGS. 5A and 6A, solid curves A represent lifts (opening areas) of the intake valve 7 corresponding to the engine crankshaft angles, as seen by the substantially frustroconical shape thereof, and dotted curves B in a sharp angled shape represent the opening angle, i.e., the opening area of the rotary valve 11.

FIG. 5A relates to the full throttle condition of the engine. During the initial suction stroke of the engine the intake valve 7 and the rotary valve 11 begin to open together at point a on the graph of FIG. 5A, namely, adjacent the top dead center of the engine suction stroke. Similarly, the two valves close together at the final stage of the suction stroke of the engine at point b in the graph. FIG. 5B is a corresponding P-V diagram for a full-throttle engine running condition.

FIG. 6A relates to a partial engine load condition to which the present invention is most closely directed. In this case, the rotary valve 11 is, as indicated by dotted curve B in FIG. 6A, opened prior to the opening of the intake valve due to the angular movement of the adjustment lever 21 cuased by depression of the vehicle accelerator pedal. During the initial opening of the rotary valve 11, no aspiration of mixture is allowed because the intake valve is closed. By the time of the initial opening of the intake valve 7, the rotary valve 11 is substantially fully opened. The rotary valve 11 closes at point c midway of the suction stroke and then in the final stage of the intake stroke of the engine near the bottom dead center position of the piston 2, the intake valve is closed.

Since during the initial suction stroke the intake valve 7 begins to open while the rotary valve 11 is fully open as described above, the mixture air/fuel is aspirated into the cylinder 1. It may be seen in FIG. 6A that at the midpoint 1 of the intake valve lift cycle the rotary valve 11 is closed. As a result, due to the lowering movement of the piston during the following intake stroke, the mixture in the manifold in the region between the rotary valve 11 and the intake valve 7 adiabatically expands to thereby reduce the pressure thereof up to point (2) at the final intake stroke as shown in the corresponding P-V diagram of FIG. 6B. At this time, the intake valve 7 is closed to begin the compression stroke. During the compression stroke, the mixture within the cylinder 1 is compressed along the compression stroke curve shown in FIG. 6B. Following this, the mixture is ignited and the expansion and exhaust strokes performed.

Figure 6B:
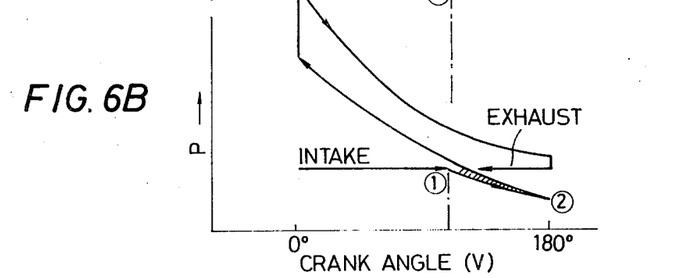

According to the present invention, as illustrated in the P-V diagram of FIG. 6B, negative work is conducted only between point (1) and point (2) with the point (1) occurring at the midpoint of the intake stroke and the point (2) occurring during the final intake stroke. Thus, only an extremely small amount negative work is performed as indicated by the hatched region in the diagram. Expressed in another way, for partial load operations, in comparison with the negative work as illustrated in the hatched region in FIG. 1 according to the prior art modern engines where only the throttle valve is used to control the amount of aspired air, it is readily understood that the amount of negative work, as illustrated in FIG. 6, is advantageously reduced with the use of the invention. Thus, use of the present invention leads to a significant reduction in the fuel consumption due to the small negative work performed.

To realize the above noted effect, in accordance with the present invention, the carburetor is preferably constructed so that, for partial loads, a fixed predetermined air/fuel ratio of mixture is provided without any throttling effect. Present day gasoline injection type engines are also capable of accomplishing such.

As described above, a rotary valve is used as the control valve. However, other equivalent valves may be used which obtain the same effects. In a preferred modification, such valves may be disposed in the intake port 5 in the cylinder head 4 while in the first-described preferred embodiment, the rotary valve 11 is disposed in the intake passage or manifolds 10.

Figure 7:
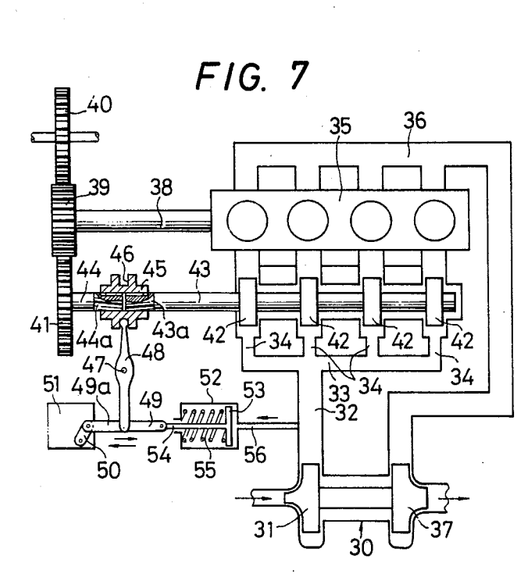
FIG. 7 is a schematic view of a turbocharged engine to which the invention is applied.

Briefly, an application of the present invention to a turbocharged engine will hereinafter be described with reference to FIG. 7. In FIG. 7, compressed air and/or mixture from the output side of a compressor 31 of a turbocharger, generally indicated by reference numeral 30, is supplied through an intake passage 32, intake mainfolds 33 and respective branched passages 34 to the engine, generally designated by 35. Exhaust gas from the engine 35 passes through exhaust manifolds 36 and acts on an exhaust turbine 37 of the turbocharger 30 to thereby drive the turbine 37 wherein the exhaust gas is expanded up to atmospheric pressure and expelled to the atmosphere.

A drive shaft 38 is rigidly coupled to the end of the crankshaft of the engine 35 and is rotated together with the crankshaft. At the end of the drive shaft 38 is secured a crank gear 39 which drives a timing gear 40 operating a distributor, a cam shaft, a fuel injection pump and the like. The crank gear 39 simultaneously meshes with a drive gear 41 which operates the rotary valve, as will hereinafter be described in more detail, rotating the rotating valve at a half of the rotational speed of the crankshaft.

In each of the intake ports of the intake manifold is disposed a rotary valve 42 each of which is substantially the same as the rotary valve 11 shown in FIG. 2, namely, a two blade valve with each secured to and operated by the drive shaft 43. The valve opening and closing period adjustment mechanisms for the rotary valves 42 are substantially the same as shown in FIG. 4. More specifically, a rotary shaft 44 and a drive shaft 43, both rotated together with the drive gear 41, are aligned along a common axis and coupled to each other through an adjustment member 45. At the connecting ends thereof are formed helical splines 43a and 44a having oppositely directed screw threads with the helical splines engaged with projections formed in inner peripheries of the adjustment member 45.

An adjustment lever 48, pivotally supported by a shaft 47, is engaged with an annular groove formed on the outer periphery of the adjustment member 45 at one end and is pivotally coupled to an intermediate portion of a link 49 at the other end. The left side end 49a of the link 49 is connected to a lever 50 of a fuel flow adjusting device 51 which, for example, in a Diesel engine may be a fuel injection pump, to thereby adjust the fuel supply rate. The right side end of the link 49 is connected to one end of a piston rod 54 the other end of which is connected to a piston 53 disposed in a cylinder 52. Between the left side end wall of the cylinder 52 and the piston 53 is interposed a spring 55 which normally biases the piston 53 to the right. An inlet port formed in the right end wall of the cylinder 52 communicates with the intake passage 32 (FIG. 7), or, alternately, with the exhaust passage 36 (FIG. 7A), through a tube 56 so that compressed air from the compressor 31 or exhaust gas passing through the exhaust passage 36 acts in the right side chamber defined by the cylinder 52 and the piston 53.

A turbocharger 30 is used in which the maximum output ability thereof is produced at an intermediate speed of the engine 35. In other words, the turbocharger 30 has half of the flow-producing ability of a turbocharger used in a normal supercharging system.

More particularly, the turbocharger 30 is so constructed that for a maximum engine speed of 2000 rpm an outlet pressure as at point (5), for example, at 1000 rpm is obtained as shown in FIG. 8. The outlet pressure provided by such a turbocharger is theoretically four times that of the outlet pressure at point (11) at 1000 rpm in a normal supercharging system. Accordingly, with the invention, it is possible to enhance the engine output power to the same extent. Moreover, at the engine idle speed, for example, 500 rpm, the supercharged pressure corresponding to the point (11) of the normal supercharging system at 1000 rpm can be obtained with the turbocharger specified for use in the present invention. Thus, the engine torque at idle speed according to the present invention is greatly enhanced in comparison with a normal turbocharger to the same extent.

If only such a turbocharger having its maximum output at intermediate engine speeds were used with nothing more, when the engine is operated above the intermediate speeds, the turbocharger would be operated at excessive rates resulting in breakdown. This is prevented, in accordance with the present invention by the opening and closing periods of the rotary valves 42 being made adjustable above the engine intermediate speeds. More specifically, the opening and closing timing of the rotary valves is set earlier as the engine speed increases above the intermediate speeds. This leads to aspiration of air in inverse proportion to the engine speed in the engine intake stroke while, simultaneously, the amount of fuel supplied is in proportion to the amount of air aspirated.

Accordingly, above the intermediate engine speeds, the amount of air aspirated and the fuel supplied per unit time are maintained constant so that a constant engine output power is provided irrespective of the engine speed above intermediate engine speeds. On the other hand, the engine torque is reduced in inverse proportion to the engine speed as indicated by the dotted line (6) to (12) in the torque curve of FIG. 8. The output power of the exhaust gas emitted, due to the constant output power, is also constant and the compressor 31 is therefore driven at a constant output power by the exhaust gas turbine 37. The operational point (5) designates the outlet pressure and the gas flow rate from the turbocharger 30 at the intermediate engine speeds, for example, at 1000 rpm at the full load of the engine. At engine speeds of more than 1000 rpm the engine is supplied with compressed air at the point (5).

The supercharged engine shown in FIG. 7 will now be described in further detail.

Since the turbocharger 30 is so designed that its maximum output is provided at the intermediate engine speeds, for example, at 1000 rpm, the supercharged pressure along the curve (11) to (5) in FIG. 8 is obtained in a range between the engine idle speed and 1000 rpm. If the fuel supply rate is adjusted, for example, by a well-known boost compensator or the like, the engine torque will be substantially increased in proportion to the amount of fuel supplied following the torque curve (8) to (6) in FIG. 8. As the engine speed is further increased, the outlet pressure from the turbocharger 30 increases and hence the pressure within the intake passage 32 also increases. Simultaneously the pressure within the intake passage 32 is applied to the right side chamber of the cylinder through the tube 56 so that the piston 53 is moved leftward against the spring force of the spring 55. The movement of the piston 53 is transmitted to the piston rod 54, the link 49 is moved leftward, the adjustment lever 48 one end of which is pivotally connected to the link 49 is rotated clockwise and the adjustment member 45 is moved rightward.

Since rightward movement of the adjustment member 45 advances the rotational phase from the shaft 44 to the drive shaft 43, the opening and closing timing of the rotary valves 42 is advanced. That is, the valve closing timing of the rotary valve 42 is advanced to thereby reduce the amount of the air to be aspirated.

At the same time that the link 49a moves leftward, the lever 50 of the fuel supply adjusting device 51 is operated to reduce the amount of fuel supplied per revolution of the engine 35. The adjustng device 51 is so chosen that the amount of aspirated air and the amount of the fuel supplied per unit of time are constant. For example, with the turbocharger 30 constructed so as to provide its maximum output at an intermediate speed of 1000 rpm, at a high engine speed of, for example, 2000 rpm, the flow rate and thermal energy content per unit of time of the exhaust gas is maintained constant at a half of the amount of engine aspiration air and a half of amount of fuel supplied in previous systems. Accordingly, the same laod as that at 1000 rpm is applied to the exhaust turbine 37 at 2000 rpm. Also, the same outlet pressure and air flow rate as at 1000 rpm are provided by the compressor 31 even at high engine speeds. Thus, the amount of air and the amount of fuel supplied to the engine are maintained constant above the middle engine speeds so that the output horsepower generated above the middle engine speeds is also maintained constant. Therefore, the torque produced is in inverse proportion to the engine speed. As a result, a constant output power engine which is very suitable for automotive engines in which the torque is reduced from that of middle engine speeds at high engine speed is provided with the invention.

Figure 7A:
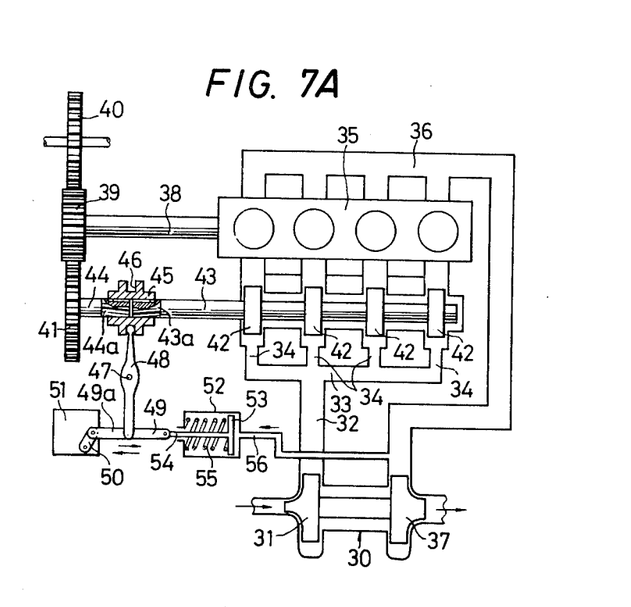
FIG. 7A shows a tubocharged engine wherein an adjusting means operates in response to exhaust gas pressure.

Moreover, the operational cylinder 52 may be connected to the exhaust passage 36, as shown in FIG. 7A rather than the intake passage 32 as shown in FIG. 7, through a tube to apply exhaust manifolds pressure to the cylinder 52 to obtain the same effect. That is, the pressure within the exhaust passage 36 also increases in proportion to the second power of the exhaust gas flow rate in the exhaust passage 36 and, by adjusting the pressure so as to maintain it constant above the intermediate engine speeds, the same effect as noted above can be obtained.

Figures 9, 10:
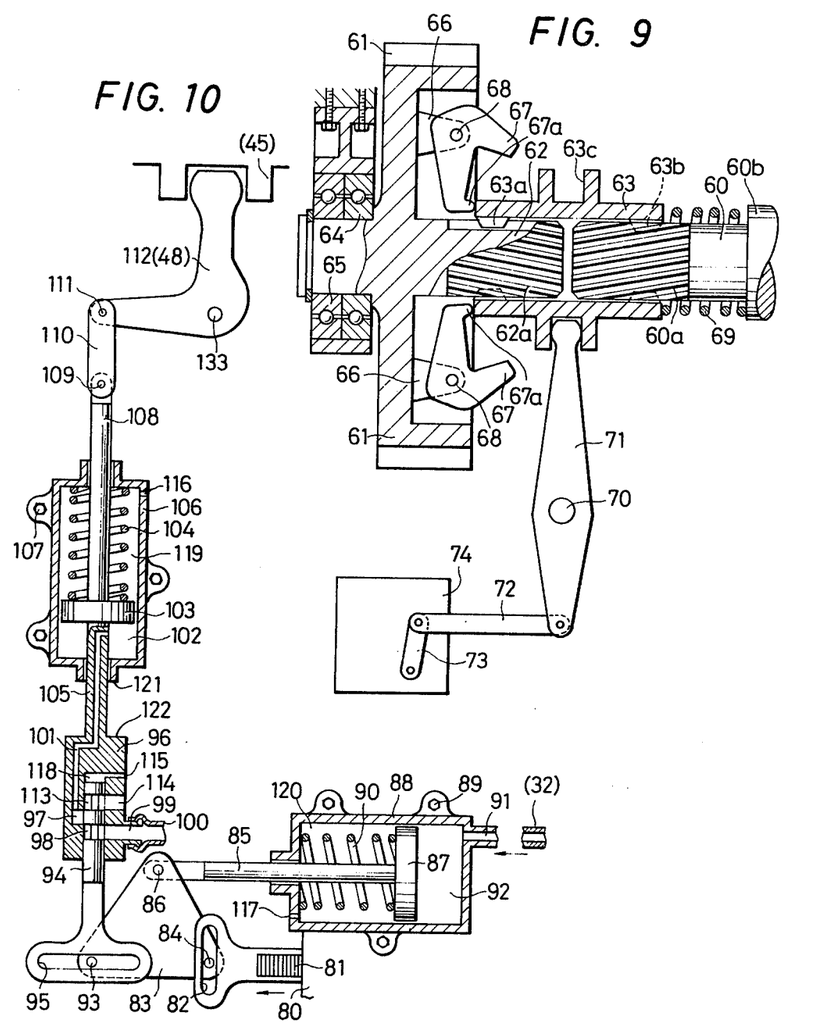
FIG. 9 is a cross-sectional view of a second embodiment of the invention.
FIG. 10 is a partly fragmented plan view of a third embodiment of the invention.

FIG. 9 shows another embodiment of an opening and closing adjusting mechanism for the rotary valves 42 in which centrifugal force is utilized to operate the adjustment member. At the opposing ends of a drive shaft 60 which rotates together with the rotary valves and a rotary shaft 62 of a timing gear 61 are provided helical splines 60a and 62a which have opposite screw threads. The helical splines are engaged with projections 63a and 63b formed in inner peripheries of a adjustment member 63. The timing gear 61 which rotates the rotary shaft 62 is rotatably supported by ball bearings 64 and 65. A pair of brackets 66 are provided in an inner concave portion of the timing gear and a pair of centrifugal weights 67 are pivotally supported on the brackets 66 by a pair of pins 68. A pair of inner projections 67a which are formed integrally with the weights 67 are in abutment with the left side end of the adjustment member 63 as shown. A spring 69 is interposed between a large diameter portion 60a of the drive shaft 60 and the right side end of the adjustment member 63 to normally bias the adjustment member 63 toward the inner projections 67a of the centrifugal weights 67. One end of the adjustment lever 71, pivotally supported by a shaft 70, is engaged with an annular groove 63c formed in an outer periphery of the adjustment member 63 and the other end of the adjustment lever 71 is coupled to a lever 73 of fuel supply adjustment device 74 through a link 72.

When a predetermined engine speed is exceeded, the above-described centrifugal weights 67 are swung against the spring force of the spring 69 so that the adjustment member 63 is moved rightward by the inner projections 67a. A phase difference is then accordingly applied between the rotary shaft 62 and the drive shaft 60 by the helical splines 62a and 60a engaged with the projections 63a and 63b of the adjustment member, respectively. That is, the drive shaft 60 is rotated in a direction such that the valve closing period of the rotary valves is advanced. As a result, the amount of air which is aspirated in the engine is reduced. Upon rightward movement of the adjustment member 63, the adjustment lever 71, one end of which is engaged with the annular groove 63c formed in the adjustment member 63, is rotated clockwise about the shaft 70 and so that the lever 73 of the fuel supply adjusting means 74, coupled to the other end of the lever 71 through the link 72, is moved in a direction such that the fuel supply is reduced. Therefore, when the predetermined engine speed is exceeded, the amount of the aspirated air and the amount of the fuel supplied decrease in inverse proportion to the engine speed. In this manner, it is possible to maintain the engine output power constant above the predetermined engine speed.

FIG. 10 shows a still further embodiment according to the present invention in which the valve opening and closing period of the rotary valves is controlled in response to a fuel injection pump which is used to supply fuel in a Diesel engine. In this embodiment, for any engine running condition, a constant air/fuel ratio mixture and compressed air flow are supplied to the engine. A governor (not shown) of the fuel injection pump 80 is so constructed that by well-known means such as a torque cam or the like, the maximum amount of fuel is controlled to follow the torque curve (14), (6) and (12) in FIG. 8 in response to the engine speed. A fuel supply rack 81 of the fuel injection pump 80 is operated by the governor so as to control the amount of fuel supplied. In the specific embodiment shown in FIG. 10, if the rack 81 is moved leftward in the direction of the arrow, the amount of fuel supplied increases. Accordingly when the governor is operated to increase the amount of fuel injected in accordance with the accelerator pedal position, the rack 81 moves leftward.

In the end portion of the rack 81 is formed a slot 82 perpendicular to the direction of movement of the rack 81. A pin 84 in a link member 83 which has the form of a triangle, is slidably disposed in the slot. The link member 83 is pivotally connected to a pin 86 in one end of a piston rod 85 secured to the piston 87. The piston 87 is slidably disposed within a cylinder 88 secured to the fuel injection pump 80 or the engine body (not shown).

Between the piston 87 and the left side inner end wall of the cylinder 88 is a spring 90 which normally biases the piston 87 rightward. In the right side wall of the cylinder 88 is formed a communication port 91 communicating with the intake passage 32 within which pressure is applied to a cylinder chamber 92. With this construction, when the pressure within the intake passage 32 in FIG. 7 is high, that is, supercharged pressure is high, the pressure in the cylinder 92 is also high and the piston 87 is moved leftward against the spring force of the spring 90 whereby the link member 83 is rotated counterclockwise by the piston rod 85 around the pin 84.

A pin 93 in the link member 83 at its left end is slidably and movably disposed in a slot 95 formed perpendicular to the direction of movement of the piston valve 94. Accordingly, when the rack 81 is moved leftward in the direction indicated by the arrow, the link 83 is rotated clockwise about the pin 86 whereas, when the piston rod 85 moves rightward, the link member 83 is rotated clockwise around the pin 84 to thereby move a piston valve 94 upward relative to a valve body 96 whereby a chamber 97 in the valve body 96 is communicated with a chamber 98 defined by the piston valve 94. The chamber 98 communicates with a flexible tube 100 through a port 99 to a hydraulic pump or air compressor whereby fluid having a predetermined sufficiently high pressure and flow rate is supplied thereto. When the chamber 97 communicates with the chamber 98 upon the upward movement of the piston valve 94, the fluid enters the chamber 97 and passes through a passage 101 and a passage formed in a piston rod 105 formed integrally with the valve body 96 into a chamber 102 in a cylinder 106 mounted on the fuel injection pump body or the engine body by bolts 107. This causes piston 103 to move upward against the spring force of a spring 104 due to the pressure of the fluid in the chamber 102.

The piston rod 105 is secured to the undersurfaces of the piston 103 and hence upward movement of the piston 103 causes a movement closing the communication between the chamber 98 of the piston valve 94 and the chamber 97 of the valve body 96. Until communication between the two chambers is interrupted, the piston 103 moves slidingly upward in the cylinder 106 against the spring force of the spring 104. The lower end of a piston rod 108 is secured to the upper surface of the piston 103 while its upper end is pivotally coupled to a lower end of a link 110 through a pin 109. The upper end of the pin 110 is pivotally connected to an adjustment lever 112 through a pin 111.

The adjustment lever 112, which is substantially the same as the adjustment lever 48 shown in FIG. 7, is pivotally supported by a shaft 133 and the upper end of the adjustment lever 112 is rotatably coupled to the adjustment member 45 in the same manner. Helical splines formed in the drive shaft 43 and the rotary shaft 44 threadedly engaged with the adjustment member 45 are provided with screw threads running in opposite directions to the screw threads of the corresponding helical splines 43a and 43a. Accordingly, upward movement of the piston 103, that is, clockwise rotation of the adjustment lever 112 around the shaft 133, causes a delay in the valve closing period of the rotary valves 42 as shown in FIG. 7.

When the link member 83 is rotated counterclockwise around the pin 86 or the pin 84, the piston 94 moves downward relative to the valve body 96 with the pin 93 moving along the slot 95 to communicate the chamber 97 with the chamber 113. Accordingly, fluid within the chambers 119 and 102 passes through the passage 101, chamber 97, chamber 113 and the passage 114 into the return oil line or the atmosphere. Upon the downward movement of the piston 103, the piston rod 105 and the valve body 96 are moved downwardly until the chambers 97 and 113 are closed by the piston valve 94. With the downward movement of the piston 103, the piston rod 108 also moves downwardly to rotate the adjustment lever 112 counterclockwise through the link 110 around the shaft 133 and the adjustment lever 45 is moved leftwardly to thereby advance the opening and closing period of the above-described rotary valves 42. Passages 115, 116 and 117 each formed in the valve body 96, cylinder 106 and the cylinder 88 provide vents to the atmosphere.

The operation of this embodiment will now be described. When, for example, the accelerating pedal is depressed by the driver, the rack 81 is moved leftward to thereby increase the amount of the fuel injected. Upon leftward movement of the rack 81, the pin 84 engaged with the slot 82 formed in the end portion of the rack 81 moves leftwardly. The link member 83 and the pin 84 are rotated clockwise around the pin 86 and the piston valve 94 is moved upwardly by the pin 93 of the link member 83 with the pin 93 moving leftward in the slot 95.

The upward movement of the piston valve 94, as is apparent from the explanation above, causes the adjustment lever 112 to rotate clockwise around the shaft 133 to thereby delay the valve closing timing of the rotary valve 42 so that it coincides with the opening and closing period of the intake valve so that the amount of the aspirated air is increased corresponding to the increase in the amount of fuel injected. The increase in the aspirated air and the injected fuel cause the energy of the exhaust gas to increase thereby increasing the driving force on the exhaust turbine of the turbocharger whereby the compressor thereof is driven at a higher rate and hence the supercharged pressure is raised.

This phenomenon leads to a pressure increase in the intake passage 32. As a result, the pressure in the chamber 92 of the cylinder 83 communicating with the intake passage 32 as shown in FIG. 10 increases and the piston 87 and the piston rod 85 are moved leftward in the figure against the force of the spring 90. Accordingly, the link 83 coupled to the piston rod 85 and the pin 86 coupled thereto are rotated counterclockwise about the pin 84. Upon the counterclockwise operation of the link member 83, the pin 93 is moved along the slot 95 to thereby move the piston valve 94 downwardly. The downward movement of the piston valve 94 as mentioned above causes the adjustment lever 112 to rotate counterclockwise around the shaft 133 and to thereby advance the opening and closing period of the rotary valves 42 so that the amount of air aspirated into the engine is adjusted in accordance with the increase of the air supply pressure.

Figures 11, 13:
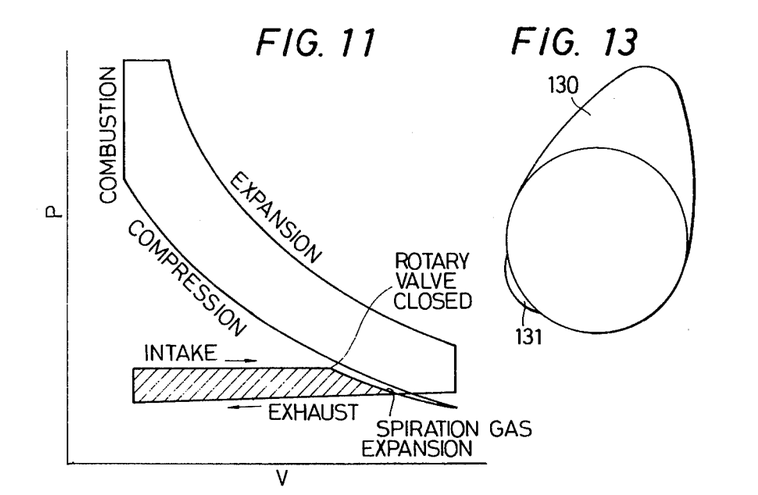
FIG. 11 is a P-V diagram of an engine employing the invention.
FIG. 13 is a plan view of the profile of a cam used with some embodiments of the invention.

The device according to the present invention is thus operated so that not only for the full load conditions of the engine but also for the partial loads thereof the rates of the fuel injection and the air aspiration are always maintained constant and, in addition, the rate of excessive air induction is minimized. Accordingly, for any engine running condition, by the application of the device as specified above, it is possible to maintain the rate of excessive induction at the maximum engine output and, for this reason, the combustion temperature is high at the maximum output power to thereby provide a high combustion efficiency. The exhaust temperature is also high so that the exhaust turbine of the turbocharger is driven at a high efficiency. This result also leads to the occurrence of the high supercharged pressure at low exhaust pressure and, accordingly, the hatched area in the P-V diagram in FIG. 11 is increased. They represent an increase of energy production amount in the intake pressure for the intake stroke and the thermal efficiency of the engine and the output power of the engine are accordingly enhanced.

When the engine is operated at the point (15) between the points (8) and (6) in FIG. 8, the rate of fuel supply and the corresponding output torque depend on the supply pressure produced by the turbocharger. The supply pressure which can be generated by the turbocharger is plotted on the curve from the point (4) to (5) shown in FIG. 8. Therefore, for example, for the point (16) on the curve (4) to (5), the rate of the fuel injection must correspond thereto. Even if the accelerator pedal's position and the governor require a torque at point (17), since the pressure in the cylinder chamber 92, that is, the intake pressure, is low in comparison with that at point (5), the piston 87 will not move leftward against the spring 90 and will stop in the equilibrium position defined by the force of the spring 90 and the pressure force in the chamber 92.

At this time, the rack 81 is moved leftward according to the position of the accelerator pedal's position and the link member 83 is rotated clockwise around the pin 86 to thereby move the pin 93 upwardly and to move the piston valve 94 upwardly. The upward movement of the piston valve 94 as mentioned above causes the adjustment lever 112 to rotate clockwise around the shaft 133 so as to delay the valve closing timing of the rotary valves 42 to obtain the state shown in FIG. 5 at its final state. That is, the state wherein the period coincides with the opening and closing period of the intake valves. In this state, a lower end 121 of the cylinder 106 abuts against an upper end 122 of the valve body 96 so that the pin 93 is prevented from moving further upwardly. Therefore, the pin 84 and the rack 81 are prevented from moving further leftward and the amount of fuel injection is restricted. Namely, the device according to the present invention serves as a boost control device which controls the maximum rate of fuel supply in accordance with the intake pressure.

When the engine speed is further increased, the supercharged pressure increases along the curve (16) to (5) in FIG. 8 according to the characteristics of the turbocharger. As this happens, the rotary valves 42, as mentioned above, coincide with the completely closed state, that is, the opening and closing periods of the intake valves and the pin 93 is in a position to prevent further upward movement while the piston 87 further compresses the spring 90 moving it leftward to thereby move the pin 86 connecting the piston rod 85 and the link member 87. Therefore, the pin 93 of the link member 83 moves leftward in the slot 95 as does the pin 84 so that the rack 81 is also moved leftward to thereby increase the amount of fuel injected.

By this operation, the amount of fuel injected increases in response to the intake pressure along the operational curve (11) to (5) in FIG. 8 with a suitable air/fuel ratio maintained. The corresponding torque generated follows the curve (8) to (6) as shown.

At the point (5) in FIG. 8, the maximum supercharged pressure of the turbocharger is reached, the amount of fuel injected is at a corresponding maximum and the output torque from the engine is also at its maximum value. When the engine speed further increases, the amount of fuel injected is reduced in inverse proportion to the engine running speed by the action of the governor as shown by the torque curve from points (6) to (12).

With reference to FIG. 10, since the intake pressure at the point (6) of the torque curve is at a maximum, the piston 87 and the pin 86 are at their leftmost positions and the amount of the fuel injected is increased with the engine running speed thereby causing the rack 81 to move rightward. As a result, the pin 84 engaged with the rack 81 is moved rightward and the link member 83 is rotated counterclockwise around the pin 86. With the pin 93 moved rightward along the slot 95, the piston valve 94 is moved downward.

The downward movement of piston 94 causes the adjustment lever 112 to rotate counterclockwise around the shaft 133 to thereby advance the valve closing period of the rotary valves 42. Accordingly, the amount of air induced into the engine is limited with the amount of intake air reduced according to the decrease in the amount of fuel injected. With such a construction, for the torque curve from (6) to (12) in FIG. 8, the amount of fuel injected and the amount of aspirated air per unit time are maintained constant. Therefore, the energy of the exhaust gas is also maintained constant. For this reason, the turbocharger is always driven at the maximum output point (5) for the torque curve between points (6) and (12) of FIG. 8.

In a turbocharged engine, the pressure of the supercharge is generally quite high and the maximum pressure during combustion with the same compression ratio as a non-supercharged engine is excessively high. This tends to cause problems regarding the mechanical strength of engine components. Accordingly, it is required that the compression ratio of the engine be reduced. This requirement unfortunately leads to starting problems at low temperatures. This problem is solved by the provision of control valves, namely, a rotary valve as described above according to the present invention.

Figure 12:
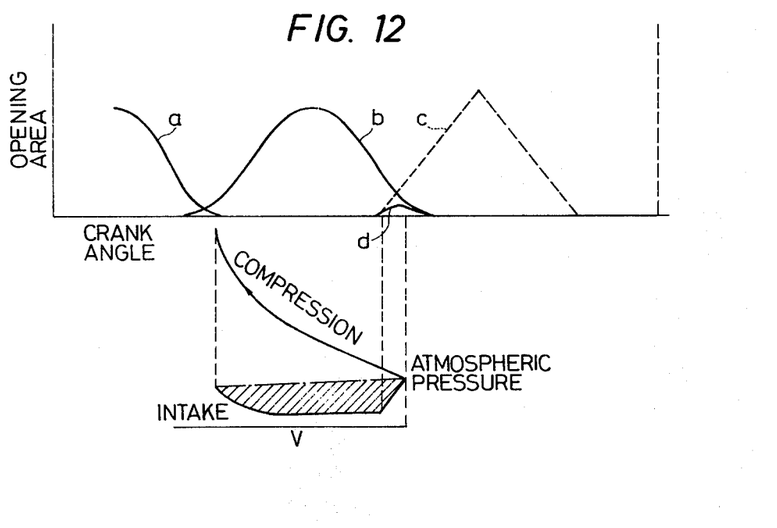
FIG. 12 is a graph showing the relationship between the valve opening area and the P-V diagram.

FIG. 12 is a graph showing a cycle during the starting of an engine employing the invention wherein the curves a, b and c represent the opening areas of an exhaust valve, an intake valve and the corresponding rotary valve, respectively. As the curves show, the valve opening period of the rotary valve is delayed by a relatively long period of time with respect to the opening and closing period of the intake valve. Therefore, since at the beginning of the intake stroke the rotary valve (c) is closed, no air is inducted and, with the lowering movement of the engine piston, the air between the rotary valve and the intake valve and within the intake port and the combustion chamber expands. This expansion is adiabatical so that the temperature of the air is reduced. Near the bottom dead center of the intake stroke, the intake valve is opened, air is rapidly introduced into the cylinder thereby adiabatically compressing the air within the cylinder so that the temperature thereof is the same as that before the expansion. At the same time, the air taken into the cylinder near the intake bottom dead center position is also adiabatically compressed so that the temperature of the air at the final stage is raised.

According to repeated experiments, it has been found that when the pressure is reduced to about 0.5 atm it is possible to enhance the temperature by about 50° C. at the end of the intake stroke. Accordingly, the temperature of the air within the cylinder near the top dead center of the compression stroke is raised to thereby enhance the startability of the engine.

In addition, an exhaust cam shown as in FIG. 13 may be used to further enhance the cold startability of the engine. The exhaust cam shown in FIG. 13 has two cam lobes. The main cam lobe 130 functions in the same manner as a normal exhaust cam to operate the exhaust valve along the curve a shown in FIG. 12. The sub cam lobe 131 serves to lift the exhaust valve a relatively small amount during a short period near the end of the intake stroke. Since the gas temperature in the exhaust passage is at atmospheric temperature before the first combustion cycle, the first combustion cycle with the invention is the same as that of a prior art engine. After the first combustion cycle, the exhaust gas, which will be at a high temperature due to combustion, is introduced back into the combustion chamber or cylinder whereby the gas temperature within the cylinder at the beginning of the compression stroke increases to thereby smooth the start of the engine at low temperatures.

Figure 14:
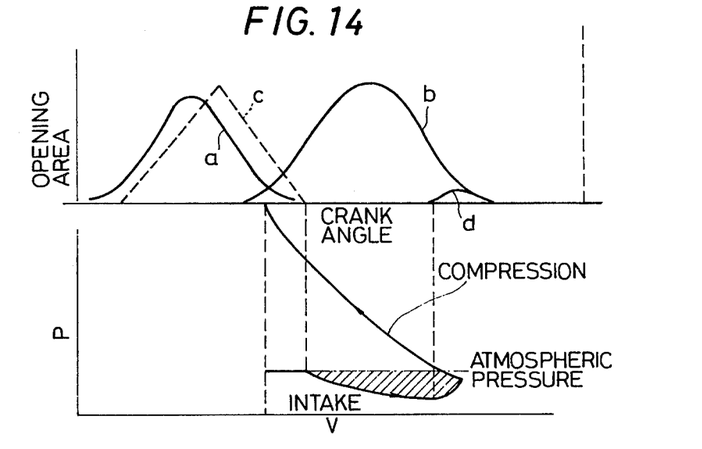
FIGS. 14 and 15 are graphs showing the relationship between valve opening areas and the P-V diagrams.

FIG. 14 shows graphically engine operating conditions at idle speed using the exhaust cam having both a main cam lobe 130 and sub cam lobe 131. The valve opening period of the rotary valve (c) is far advanced with respect to that of the intake valve (b). After a small amount of air is aspirated during the intake stroke, the rotary valve is closed. Thereafter, the intake charge is adiabatically expanded by the lowering movement of the engine piston which reduces the pressure and temperature of the charge. Near the intake bottom dead center, the exhaust valve is opened by the exhaust sub cam lobe (d) to introduce some of the exhaust gas back into the cylinder and to increase the pressure and the temperature of the gas within the cylinder at the beginning of the compression thereby producing the desired combustion characteristics whereby the generation of blue-white smoke and the odor inherent to the Diesel engines of the direct injection type are prevented at low temperatures.

Figure 15:
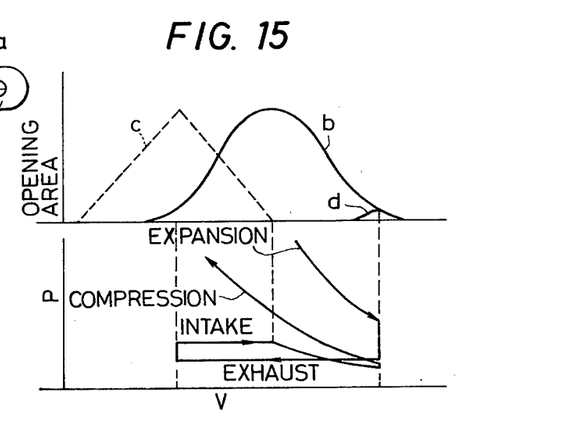

The opening amount of the exhaust valve caused by the sub cam lobe 131 is small and the period thereof is short so that at high speeds of the engine its effect is small. As shown in FIG. 15, the intake pressure is higher than the exhaust pressure due to the action of the turbocharger. The valve closing period of the rotary valve is delayed with respect to the engine idling speed and the expansion ratio during the intake stroke is small so that the reverse introduction of exhaust gas by the exhaust sub cam lobe is substantially neglegible thereby having little affect on the performance of the engine at high or middle speeds of the engine.

Figure 16:
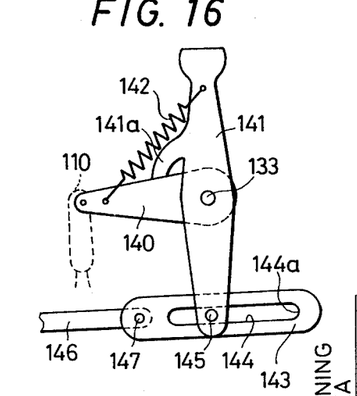
FIG. 16 is a plan view of a mechanism for delaying the valve closing period while the engine is being started.

FIG. 16 shows an operating mechanism of the engine start system according to the above described embodiment in which an adjustment lever thereof is provided which is different from that shown in FIG. 10 and includes two levers 140 and 141 between which a tension spring 142 is connected so as to thereby contact a projection 141a formed on the lever 141 against the upper surface of the lever 140 whereby for normal engine drive the two levers are integrally operated. The left side end of the lever 140 is coupled to the link 110 shown in FIG. 10. A pin 145 is rigidly coupled to the lever end portion of the lever 141. The pin 145 is engaged with a slot formed in a link 143 to thereby be movable left and right. The left end of the link is connected, for example, through pin 147 to an adjustment rod 146 which is in turn connected to a manual operational lever which is operable by the driver.

When, as shown in FIG. 12, the valve opening period of the rotary valve is far delayed, the adjustment rod 146 is moved leftward to displace the pin 145 leftwardly by abutment with the right end of the slot 144. Therefore, the lever 141 is rotated clockwise around the shaft 133. The adjustment member 45 shown in FIG. 10 and which is connected to the upper end of the lever 141 is moved leftward whereby the valve opening period of the rotary valve is delayed to a position designated by dotted lines in FIG. 12. During this operation of the lever 141, the lever 140 does not move but the tension spring 142 is extended so that the projection 141a is separated from the lever 140.

For normal engine driving, during the operation of the levers 140 and 141, even if the lever 141 is rotated around the shaft 133, the pin 145 formed at the end thereof will move along the slot 144 of the link 143 to allow the two levers to move.

What is claimed is:

1. A turbocharged four-stroke, compression ignition type internal combustion engine having a substantially constant horsepower output above a predetermined engine speed comprising:

at least one main piston and associated cylinder;
a combustion chamber defined by said main piston and said cylinder;
an intake port communicating with intake passage means;
an exhaust port communicating with exhaust passage means;
a crankshaft;
a turbocharger having a turbine and a blower, said blower supplying air to said combustion chamber for supporting combustion of fuel in said combustion chamber, said turbine driving said blower and being driven by exhaust gases from said combustion chamber;
fuel supply control means;
control valve means for periodically opening and closing said intake passage means in response to rotation of said crankshaft, said control valve means being disposed in said intake passage means;
means for adjusting an opening and closing timing of said control valve means in response to a predetermined engine operating parameter and means for connecting said adjusting means to said fuel supply control means so that said adjusting means controls said fuel supply control means to control an amount of fuel supplied by said fuel supply control means, said adjusting means limiting and keeping substantially constant a fuel supply and an air supply charge delivered per unit time to said combustion chamber above said predetermined engine speed.

2. The internal combustion engine as defined in claim 1 wherein said predetermined engine speed is between 40 and 70% of a maximum engine speed.

3. The internal combustion engine as defined in claim 1 wherein said predetermined engine speed is between 50 and 70% of a maximum engine speed.

4. The internal combustion engine as defined in claim 1 wherein said turbocharger has a maximum and substantially constant output at and above said predetermined engine speed.

5. The internal combustion engine as defined in claim 1 wherein said control valve means comprises a rotary type valve rotatably disposed in said intake passage means.

6. The internal combustion engine as defined in claim 5 further comprising means for rotating said rotary type valve in response to rotation of said crankshaft.

7. The internal combustion engine as defined in claim 6 wherein the valve opening and closing periods of said rotary type valve each correspond to approximately a rotational angle of 90° and wherein said rotary valve is rotated at half the speed of rotation of said crankshaft.

8. The internal combustion engine as defined in claim 1 wherein said adjusting means comprises an annular adjusting member, said annular adjusting member having at least one protrusion engaged with helical splines of a rotary shaft driven by said crankshaft through a gear mechanism and with helical splines of a drive shaft of said control valves, said adjusting member being engaged with lever means for controlling the phase difference between said drive shaft and said rotary shaft.

9. The internal combustion engine as defined in claim 1 further comprising an exhaust valve operating cam shaft, said cam shaft having for each exhaust valve of said engine a main cam lobe for opening the corresponding exhaust valve for exhaust of exhaust gas from the corresponding cylinder and a sub cam lobe for opening said exhaust valve a small amount during a latter portion of an open period of an intake valve of said cylinder.

10. The internal combustion engine as defined in claim 1 or 9 wherein said adjusting means operates in response to the pressure of intake air in said intake passage means.

11. The internal combustion engine as defined in claim 1 or 9 wherein said adjusting means operates in response to the pressure of exhaust gas in said exhaust passage means.

12. The internal combustion engine as defined in claim 1 or 9 wherein said adjusting means comprises a rotatable link member having first, second and third rotational points disposed in a triangular arrangement thereon, an actuating cylinder having an output control arm thereof connected to one of said points of said link member and having a fluid input thereof in communication with said intake passage means, a control rod movable in response to an accelerator pedal coupled to a second one of said points of said link member, and hydraulic actuator means having an input control rod member coupled to the third one of said points of said link member, said hydraulic actuator having an output control rod, a pivotable adjusting lever, one end of said adjusting lever being coupled to said output rod of said hydraulic actuator, means for controlling the phase differences between a drive shaft and a rotary shaft coupled to rotate said control valve means, the other end of said adjusting lever being coupled to said adjusting means.

13. The internal combustion engine as defined in claim 1 or 9 wherein said adjusting means comprises a first pivoted lever having one end in engagement with means for controlling the phase difference between a drive shaft and a rotary shaft which drives said control valve means, a manual adjustment rod the position of which is adjustable by a driver, an elongated plate member having one end thereof coupled to said manual adjustment rod, said elongated plate member having a slot formed therein, the other end of said first lever having a pin member rigidly coupled thereto and slidably disposed in said slot, a projection extending from one side of said first lever, a second lever pivoted from the same point as said first lever, a spring extending from a position near said first-mentioned end of said first lever to a position near an outward end of said second lever, said end of said second lever being operatively coupled to actuator means which operates in response to said predetermined engine operating parameter, said projection having an end abutting one side of said second lever in at least one operative position thereof.

14. The internal combustion engine as defined in claim 1 or 9 wherein said adjusting means operates in response to the speed of rotation of said engine.

15. The internal combustion engine as defined in claim 10 wherein said adjusting means comprises an adjustment member having protrusions engaged with helical spline threads of a rotary shaft driven by a gear mechanism and of a drive shaft of said control means, said adjusting means being moved by centrifugal governor means rotated together with said rotary shaft.

* * * * *